(12) United States Patent
Morrison et al.

(10) Patent No.: US 8,573,903 B2
(45) Date of Patent: Nov. 5, 2013

(54) ROUND CUTTING INSERT WITH ANTI-ROTATION FEATURE

(75) Inventors: Lewis Ray Morrison, Latrobe, PA (US); Kumar Reddy Mylavaram Nikhilesh, Ligonier, PA (US); Thomas Jerry Long, Greensburg, PA (US); Jeffrey Francis Kovac, Loyalhanna, PA (US); Suresh Mali, Banganlore (IN)

(73) Assignee: Kennametal Inc., Latrobe, PA (US)

( * ) Notice: Subject to any disclaimer, the term of this patent is extended or adjusted under 35 U.S.C. 154(b) by 840 days.

(21) Appl. No.: 12/611,254

(22) Filed: Nov. 3, 2009

(65) Prior Publication Data

US 2011/0103905 A1    May 5, 2011

(51) Int. Cl.
*B23C 5/08*    (2006.01)
*B23C 5/02*    (2006.01)

(52) U.S. Cl.
USPC ........... 407/113; 407/114; 407/115; 407/100; 407/42

(58) Field of Classification Search
USPC ........... 407/113, 114, 115, 33, 34, 40, 42, 48, 407/100, 102–104
See application file for complete search history.

(56) References Cited

U.S. PATENT DOCUMENTS

| | | | |
|---|---|---|---|
| 1,460,030 A | 6/1923 | Mattson | |
| 1,838,520 A | 12/1931 | Archer | |
| 2,392,216 A | 1/1946 | Anania | |
| 2,630,725 A | 3/1953 | Black | |
| 3,213,716 A | 10/1965 | Getts | |
| 3,408,722 A | 11/1968 | Berry, Jr. | |
| 3,629,919 A | 12/1971 | Trevarrow | |
| 3,831,237 A | 8/1974 | Gunsalus | |
| 3,842,470 A | 10/1974 | Hertel | |
| 3,875,663 A | 4/1975 | Gustafson | |
| 3,946,474 A | 3/1976 | Hahn et al. | |
| 3,996,651 A | 12/1976 | Heaton et al. | |
| 4,189,264 A | 2/1980 | Kraemer | |
| 4,202,650 A | 5/1980 | Erickson | |
| 4,304,509 A * | 12/1981 | Mori | 407/114 |
| 4,315,706 A * | 2/1982 | Erkfritz | 407/101 |
| 4,626,140 A * | 12/1986 | Zweekly et al. | 407/114 |
| 4,632,593 A | 12/1986 | Stashko | |

(Continued)

FOREIGN PATENT DOCUMENTS

| DE | 3321184 A1 | 12/1984 |
|---|---|---|
| DE | 4244316 A1 | 6/1994 |

(Continued)

OTHER PUBLICATIONS

PCT/US2010/055247: International Search Report dated Jul. 21, 2011 (10 pages).

*Primary Examiner* — Andrea Wellington
*Assistant Examiner* — Sara Addisu
(74) *Attorney, Agent, or Firm* — Larry R. Meenan, Esq.

(57) ABSTRACT

A round cutting insert with an anti-rotation feature. The round cutting insert includes a plurality of projections formed on a first surface and another plurality of projections formed on an opposing surface. The round cutting insert is reversible and indexable. The round cutting insert is removably received in an insert receiving pocket in a tool body wherein the insert receiving pocket includes a plurality of dimples for receiving one of the plurality of first projections or the plurality of second projections. This arrangement prevents rotation of the round cutting insert while mounted in the insert receiving pocket.

19 Claims, 7 Drawing Sheets

(56) References Cited

U.S. PATENT DOCUMENTS

| | | | |
|---|---|---|---|
| 4,636,116 A | 1/1987 | Shikata | |
| 4,812,087 A * | 3/1989 | Stashko | 407/42 |
| 4,880,338 A * | 11/1989 | Stashko | 407/114 |
| 4,915,548 A * | 4/1990 | Fouquer et al. | 407/114 |
| 5,046,899 A | 9/1991 | Nishi | |
| 5,147,158 A | 9/1992 | Riviere | |
| 5,199,828 A | 4/1993 | Forsberg | |
| 5,236,288 A * | 8/1993 | Flueckiger | 407/36 |
| 5,275,633 A * | 1/1994 | Johansson et al. | 51/309 |
| 5,346,336 A | 9/1994 | Rescigno | |
| D363,727 S | 10/1995 | DeRoche | |
| 5,478,175 A * | 12/1995 | Kraemer | 407/7 |
| 5,542,794 A | 8/1996 | Smith et al. | |
| 5,558,142 A | 9/1996 | Ehrle et al. | |
| 5,658,100 A * | 8/1997 | Deiss et al. | 407/35 |
| 5,702,210 A * | 12/1997 | Boianjiu | 407/100 |
| D390,578 S | 2/1998 | Satran et al. | |
| 5,716,167 A | 2/1998 | Siddle et al. | |
| 5,733,073 A | 3/1998 | Zitzlaff et al. | |
| 5,772,365 A * | 6/1998 | Vogel et al. | 407/42 |
| 5,772,366 A * | 6/1998 | Wiman et al. | 407/119 |
| 5,810,518 A * | 9/1998 | Wiman et al. | 407/102 |
| 5,827,016 A * | 10/1998 | Strand | 407/115 |
| 5,836,723 A * | 11/1998 | Von Haas et al. | 407/107 |
| 5,846,032 A | 12/1998 | Murakami | |
| 5,888,029 A * | 3/1999 | Boianjiu | 407/66 |
| 5,931,613 A * | 8/1999 | Larsson | 407/103 |
| 5,934,844 A | 8/1999 | Woolley | |
| D416,917 S | 11/1999 | Xie et al. | |
| 6,050,751 A | 4/2000 | Hellstrom | |
| 6,053,671 A | 4/2000 | Stedt et al. | |
| 6,126,366 A * | 10/2000 | Lundblad | 407/102 |
| 6,152,658 A | 11/2000 | Satran et al. | |
| 6,158,928 A * | 12/2000 | Hecht | 407/102 |
| 6,164,878 A | 12/2000 | Satran et al. | |
| 6,168,356 B1 * | 1/2001 | Sjoo et al. | 407/104 |
| D442,193 S | 5/2001 | Isaksson | |
| 6,224,300 B1 * | 5/2001 | Baxivanelis et al. | 407/114 |
| 6,234,724 B1 | 5/2001 | Satran et al. | |
| 6,238,133 B1 | 5/2001 | DeRoche et al. | |
| 6,343,898 B1 * | 2/2002 | Sjoo et al. | 407/101 |
| 6,508,612 B1 | 1/2003 | Baca | |
| 6,543,970 B1 * | 4/2003 | Qvarth et al. | 407/114 |
| 6,579,042 B1 | 6/2003 | Shiraiwa | |
| D477,004 S | 7/2003 | Arvidsson | |
| 6,607,335 B2 | 8/2003 | Morgulis | |
| 6,840,716 B2 * | 1/2005 | Morgulis et al. | 407/34 |
| 6,926,472 B2 | 8/2005 | Arvidsson | |
| 6,929,428 B1 * | 8/2005 | Wermeister et al. | 407/113 |
| 6,948,889 B2 | 9/2005 | Arvidsson | |
| 7,021,871 B2 | 4/2006 | Arvidsson et al. | |
| D523,039 S | 6/2006 | Niebauer et al. | |
| 7,070,363 B2 * | 7/2006 | Long et al. | 407/113 |
| 7,073,987 B2 * | 7/2006 | Hecht | 407/113 |
| 7,121,771 B2 * | 10/2006 | Englund | 407/103 |
| 7,156,006 B2 * | 1/2007 | Hyatt et al. | 82/1.11 |
| 7,168,895 B2 | 1/2007 | Koskinen et al. | |
| 7,300,232 B2 * | 11/2007 | Wiman et al. | 407/101 |
| 7,306,409 B2 * | 12/2007 | Stabel et al. | 407/113 |
| 7,325,471 B2 * | 2/2008 | Massa et al. | 82/1.11 |
| 7,381,015 B2 * | 6/2008 | Jonsson | 407/116 |
| 7,387,474 B2 * | 6/2008 | Edler et al. | 407/113 |
| 7,390,149 B2 | 6/2008 | Wihlborg | |
| 7,407,348 B2 * | 8/2008 | Sjogren et al. | 407/119 |
| 7,458,753 B1 | 12/2008 | Niebauer et al. | |
| 7,476,061 B2 | 1/2009 | Edler | |
| 7,513,717 B2 * | 4/2009 | Engstrom et al. | 407/113 |
| 7,530,769 B2 * | 5/2009 | Kress et al. | 408/1 R |
| 7,578,639 B2 | 8/2009 | Wiman et al. | |
| 7,604,441 B2 * | 10/2009 | Bhagath | 407/113 |
| 7,607,867 B2 * | 10/2009 | Benson | 407/102 |
| 7,607,868 B2 * | 10/2009 | Noggle | 407/113 |
| 7,722,297 B2 | 5/2010 | Dufour et al. | |
| 7,785,045 B2 | 8/2010 | Viol | |
| D638,452 S | 5/2011 | Morrison | |
| D640,717 S * | 6/2011 | Morrison et al. | D15/139 |
| 7,959,383 B2 | 6/2011 | Choi et al. | |
| 8,096,735 B2 | 1/2012 | Sladek et al. | |
| D658,218 S * | 4/2012 | Morrison et al. | D15/139 |
| 8,147,171 B2 * | 4/2012 | Dufour et al. | 407/113 |
| D673,194 S | 12/2012 | Kovac et al. | |
| 8,408,848 B2 * | 4/2013 | Hecht | 407/115 |
| 8,430,607 B2 | 4/2013 | Jansson | |
| 2003/0086766 A1 * | 5/2003 | Andras | 407/102 |
| 2003/0219319 A1 * | 11/2003 | Arvidsson | 407/40 |
| 2004/0028486 A1 | 2/2004 | Englund | |
| 2005/0019110 A1 | 1/2005 | Astrakhan | |
| 2005/0019113 A1 * | 1/2005 | Wermeister | 407/113 |
| 2005/0084342 A1 | 4/2005 | Festeau et al. | |
| 2005/0152754 A1 | 7/2005 | Wiman | |
| 2005/0244233 A1 | 11/2005 | Jonsson | |
| 2006/0088390 A1 | 4/2006 | Wallstrom et al. | |
| 2006/0147280 A1 | 7/2006 | Sjogren et al. | |
| 2006/0245837 A1 | 11/2006 | Dufour et al. | |
| 2006/0269374 A1 | 11/2006 | Dufour et al. | |
| 2007/0009334 A1 * | 1/2007 | Edler | 407/107 |
| 2007/0071559 A1 | 3/2007 | Koskinen | |
| 2007/0122242 A1 | 5/2007 | Englund et al. | |
| 2007/0189862 A1 * | 8/2007 | Viol | 407/113 |
| 2007/0245535 A1 | 10/2007 | Noggle | |
| 2008/0056831 A1 | 3/2008 | Wiman | |
| 2008/0181731 A1 | 7/2008 | Wallstrom et al. | |
| 2008/0193233 A1 * | 8/2008 | Park | 407/104 |
| 2008/0317558 A1 * | 12/2008 | Niebauer et al. | 407/114 |
| 2009/0052998 A1 | 2/2009 | Sladek | |
| 2009/0097929 A1 | 4/2009 | Festeau et al. | |
| 2009/0220311 A1 * | 9/2009 | Shamoto et al. | 407/114 |
| 2009/0290946 A1 * | 11/2009 | Zastrozynski | 407/114 |
| 2010/0034602 A1 | 2/2010 | Sung et al. | |
| 2010/0061816 A1 * | 3/2010 | Koerner et al. | 407/114 |
| 2010/0158620 A1 | 6/2010 | Spitzenberger et al. | |
| 2010/0183386 A1 | 7/2010 | Heinloth et al. | |
| 2010/0239379 A1 | 9/2010 | Choi et al. | |
| 2010/0247257 A1 | 9/2010 | Paul et al. | |
| 2011/0103905 A1 | 5/2011 | Morrison et al. | |
| 2011/0116878 A1 | 5/2011 | Ebert et al. | |
| 2011/0164934 A1 | 7/2011 | Chen et al. | |
| 2012/0003493 A1 | 1/2012 | Schon et al. | |
| 2012/0251250 A1 | 10/2012 | Morrison et al. | |

FOREIGN PATENT DOCUMENTS

| | | |
|---|---|---|
| DE | 19506944 A1 | 8/1995 |
| DE | 69901623 T2 | 11/2002 |
| DE | 102005025815 A1 | 12/2006 |
| DE | 102006011581 A1 | 9/2007 |
| DE | 102008037915 B3 | 8/2009 |
| DE | 102009049088 | 4/2011 |
| EP | 300172 A * | 1/1989 |
| EP | 0599393 A1 | 6/1994 |
| EP | 0698437 A1 | 2/1996 |
| EP | 730926 A1 | 9/1996 |
| EP | 1468770 A1 | 10/2004 |
| EP | 1535681 A1 | 6/2005 |
| JP | 7299633 A | 11/1995 |
| JP | 11245105 A | 9/1999 |
| JP | 1310808 A | 11/1999 |
| KR | 10-2006-0019993 A1 | 3/2006 |
| SE | 533249 C2 | 7/2010 |
| WO | 9415741 A1 | 7/1994 |
| WO | 0128722 A1 | 4/2001 |
| WO | 2005068116 A1 | 7/2005 |
| WO | 2007037733 A1 | 4/2007 |
| WO | 2007104275 A1 | 9/2007 |
| WO | 2007127109 A2 | 11/2007 |
| WO | 2008029964 A1 | 3/2008 |
| WO | 2010017859 A1 | 2/2010 |

* cited by examiner

ROUND CUTTING INSERT WITH ANTI-ROTATION FEATURE

BACKGROUND OF THE INVENTION

The invention relates generally to cutting inserts and, more particularly, relates to round cutting inserts having an anti-rotation feature for preventing rotation of the round cutting insert mounted onto the body of a cutting tool.

The inserts used in tools such as, for example, milling cutters are mounted in complementarily-shaped pockets spaced around the periphery of the tool body. The inserts are typically secured within their respective pockets by clamping screws inserted through a hole provided in the center of the insert. During a cutting operation, such inserts often experience not only compressive and vibratory forces, but some amount of torque due to the angle between the cutting edges of the inserts and the workpiece. For cutting inserts of non-round shapes, such torque does not result in the rotation of the insert due to the interference-type fit between the angled sidewalls of such inserts and the complementarily-shaped walls of the pocket that receive them. By contrast, round inserts can rotate within their respective pockets since no such mechanical interference naturally arises between the cylindrical or frustro-conical sidewalls of round inserts and the corresponding circular walls of the pockets which receive them. The resulting rotation can loosen the clamping screw that secures the insert within its respective pocket. If the clamping screw should become sufficiently loosened, it can vibrate within the surrounding pocket severely enough to become chipped or cracked not only ruining the insert, but also jeopardizing the quality of the cut on the workpiece.

What is needed is an effective anti-rotation feature for round cutting inserts which effectively prevents such inserts from rotating without creating local stresses in either the body of the cutting insert or the pocket that receives it. Therefore, the present invention has been developed in view of the foregoing.

SUMMARY OF THE INVENTION

The present invention provides a round cutting insert with an anti-rotation feature. The round cutting insert includes a plurality of projections formed on a first surface and another plurality of projections formed on an opposing surface. The round cutting insert is reversible and indexable. The round cutting insert is removably received in an insert receiving pocket in a tool body wherein the insert receiving pocket includes a plurality of dimples for receiving one of the plurality of first projections or the plurality of second projections. This arrangement prevents rotation of the round cutting insert while mounted in the insert receiving pocket.

An aspect of the present invention is to provide a round cutting insert including a first outer surface that terminates generally outwardly in the first cutting edge and terminates generally inwardly in a first inner edge. A first inner surface extends generally inwardly from the first inner edge. The insert also includes a plurality of first projections formed adjacent to the first inner edge. A second surface terminates generally outwardly in a second cutting edge and terminates generally inwardly in a second inner edge and a second inner surface extends generally inwardly from the second inner edge. A plurality of second projections is formed adjacent to the second inner edge. In addition, a generally circular side surface extends between the first outer surface and the second outer surface.

Another aspect of the present invention is to provide a round cutting insert including a plurality of first projections formed on a first surface and a first cutting edge disposed circumferentially about the plurality of first projections. The insert also includes a plurality of second projections formed on a second surface that is generally opposed to the first surface. A second cutting edge is disposed circumferentially about the plurality of second projections.

A further aspect of the present invention is to provide an anti-rotation mounting arrangement between a round cutting insert and an insert receiving pocket in a tool body. The round insert includes a first portion that terminates in a first cutting edge, a second portion that terminates in a second cutting edge, and a circular side surface between the first portion and the second portion. The anti-rotation mounting arrangement includes a plurality of first projections extending from the first portion, a plurality of second projections extending from the second portion, and a plurality of dimples formed in the insert receiving pocket for cooperating with and receiving one of the plurality of first projections or the plurality of second projections to prevent rotation of the round cutting insert while mounted in the insert receiving pocket.

Another aspect of the present invention is to provide a cutting tool assembly having a tool body, an insert, and a fastening screw. The tool body includes an insert receiving pocket. The insert is received in the insert receiving pocket and the insert has a first portion having a first cutting edge generally disposed about an outer periphery of the first portion and a second portion having a second cutting edge generally disposed about an outer periphery of the second portion. The insert defines a non-cylindrical opening extending axially through the insert from the first portion to the second portion. The fastening screw extends through the non-cylindrical opening to removably secure the insert to the insert receiving pocket of the tool body.

These and other aspects of the present invention will be more fully understood following a review of this specification and drawings.

DETAILED DESCRIPTION

Referring to the Figures, there is illustrated a cutting insert 10, in accordance with an aspect of the invention. The cutting insert 10 includes a first or top portion 12 (see generally FIGS. 1, 2, 3 and 5) and a second or bottom portion 14 (see generally FIGS. 3, 4 and 5) and a generally circular side portion 16 that extends between the first portion 12 and the second portion 14. Thus, it will be appreciated that the cutting insert 10 is a generally round cutting insert for positioning in a tool body for performing a cutting operation on a workpiece (not shown) as will be described in more detail herein.

Figure 1:
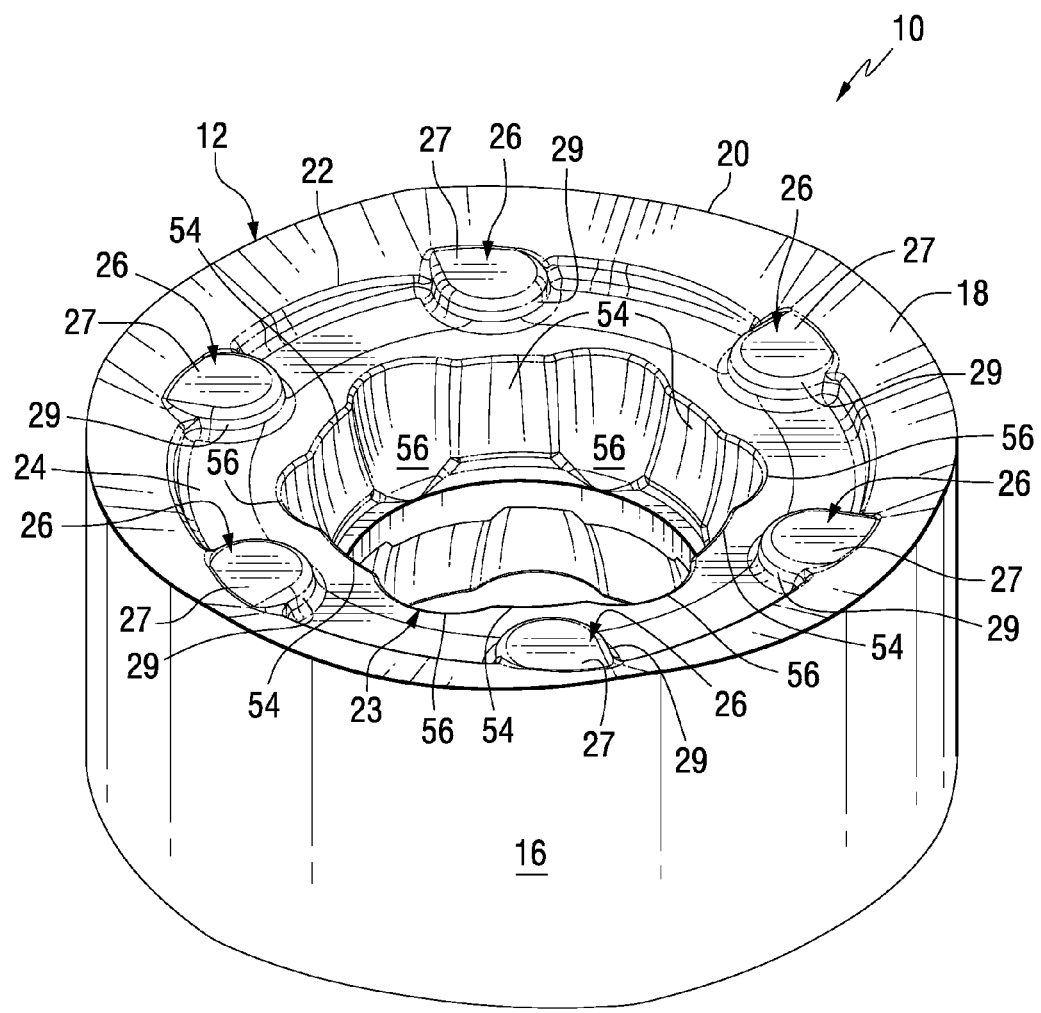
FIG. 1 is a perspective view of a cutting insert, in accordance with an aspect of the invention.
Figure 2:
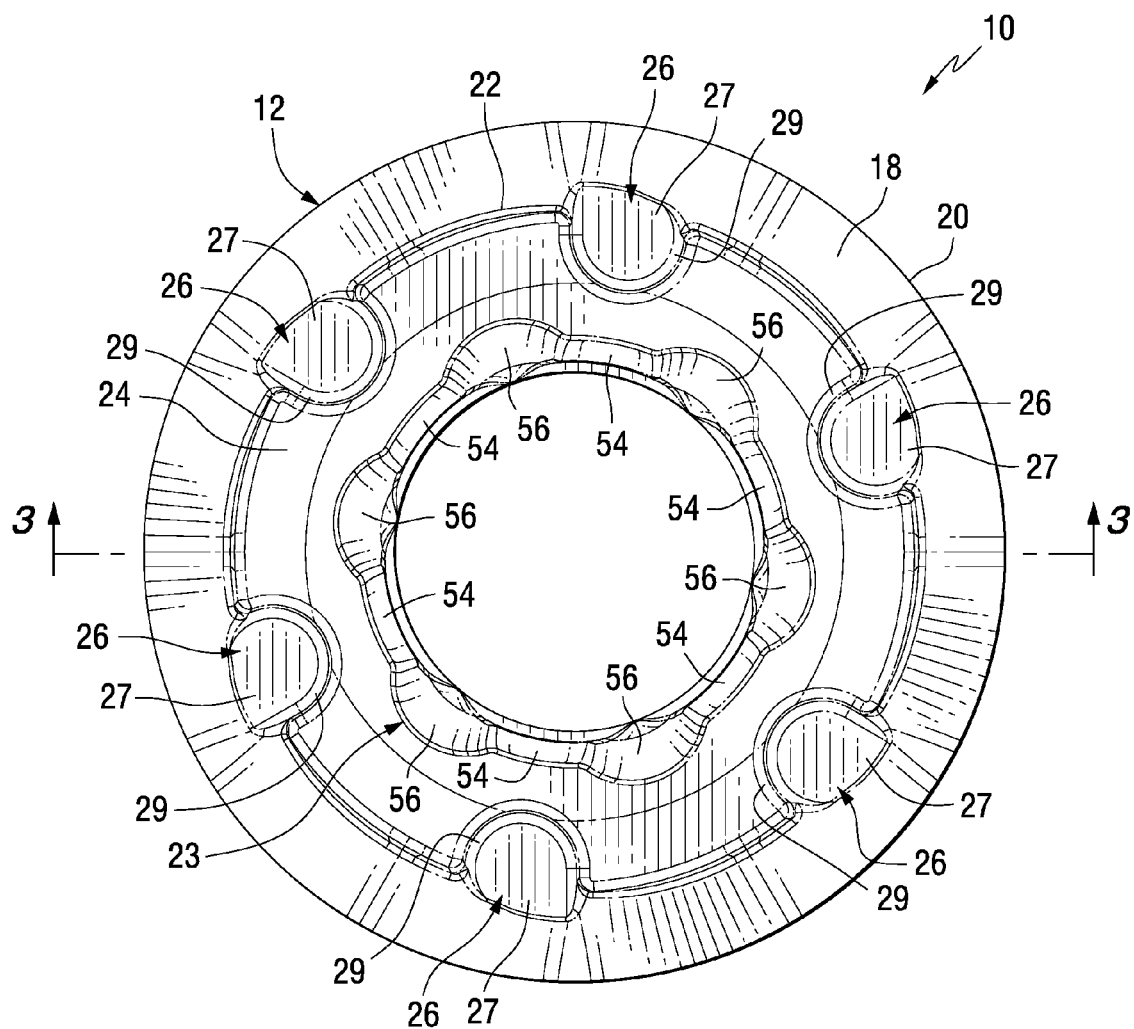
FIG. 2 is a top view of the cutting insert illustrated in FIG. 1, in accordance with an aspect of the invention.
Figure 3:
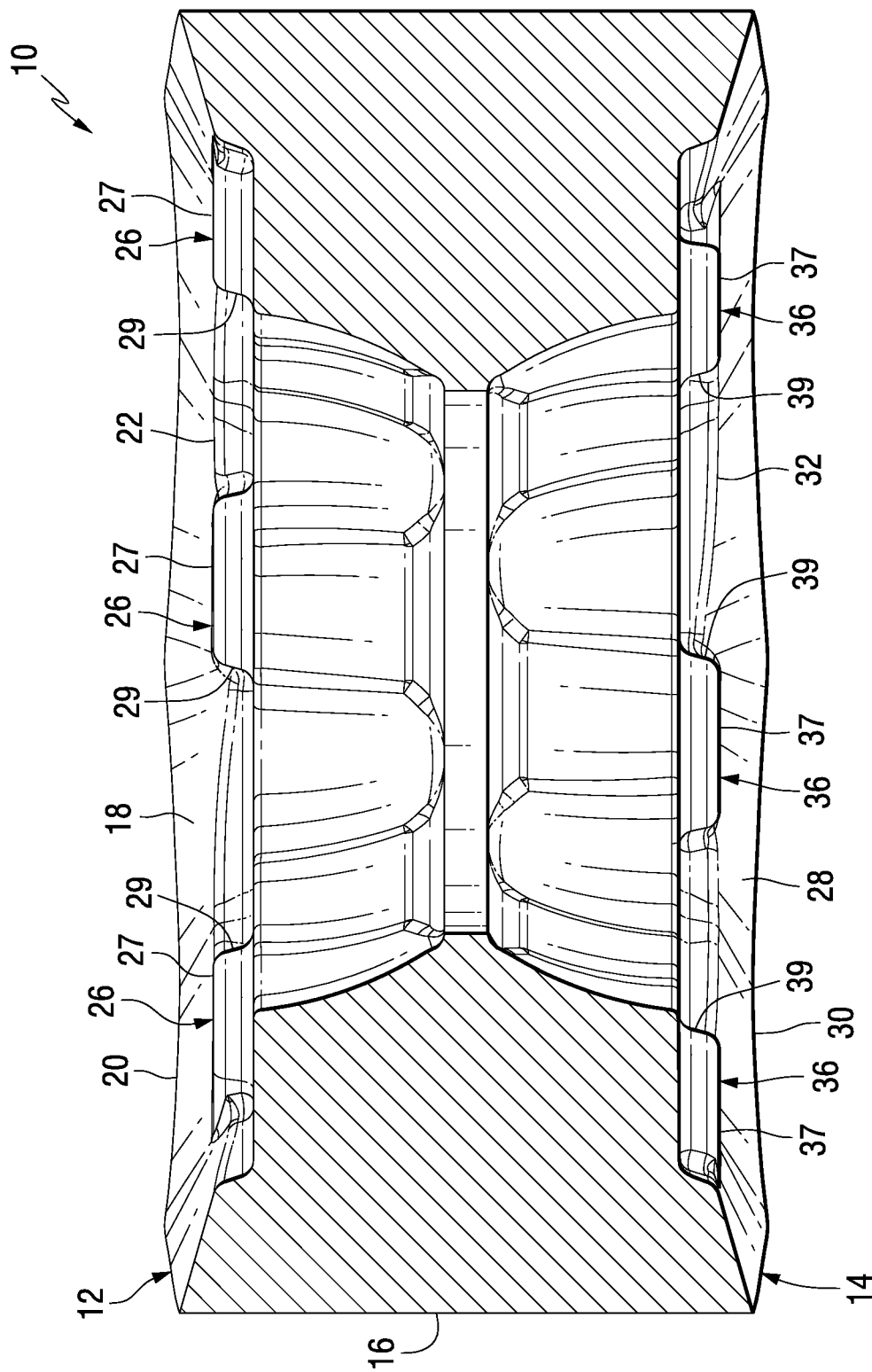
FIG. 3 is a sectional view taken along line 3-3 of FIG. 2, in accordance with an aspect of the invention.

As shown in FIGS. 1 and 2, the cutting insert 10 includes a first outer surface 18 that terminates in a generally outwardly direction in a first cutting edge 20 and terminates in a generally inwardly direction in a first inner edge 22. In one aspect, the first outer surface 18 slopes from the first cutting edge 20 toward the first inner edge 22. The cutting insert 10 also includes a first inner surface 24 that extends in a generally inwardly direction from the first inner edge 22 toward a non-cylindrical opening 23 that extends axially through the cutting insert 10. In one aspect, the first outer surface 18 may be contained in a plane and the first inner surface 24 may be contained in another plane that is non-parallel to the plane containing the first outer surface 18.

Still referring to FIGS. 1 and 2, the cutting insert 10 further includes a plurality of first projections 26. In one aspect, the plurality of first projections 26 are formed adjacent to the first inner edge 22. In another aspect, the plurality of first projections 26 are formed on the first inner surface 24 to create a raised profile projection. In another aspect, the plurality of first projections 26 are evenly circumferentially spaced about the first inner surface 24. The first cutting edge 20 is circumferentially disposed about the plurality of first projections 26 and in one aspect the plurality of first projections 26 each include a top surface 27 contained in a plane wherein at least a portion of the first cutting edge 20 is contained in a different plane.

Figure 4:
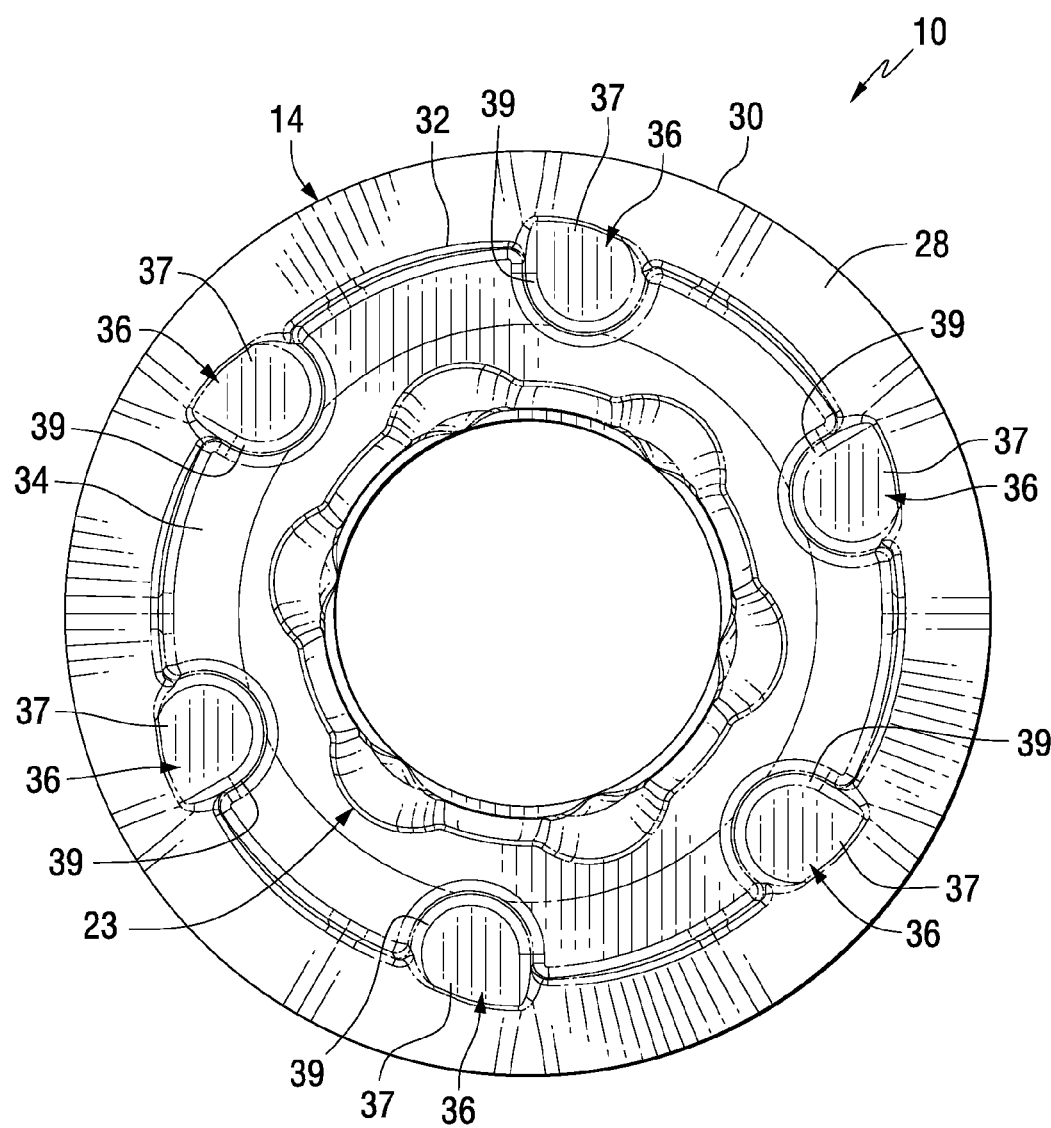
FIG. 4 is a bottom view of the cutting insert illustrated in FIGS. 1 and 2, in accordance with an aspect of the invention.
Figure 5:
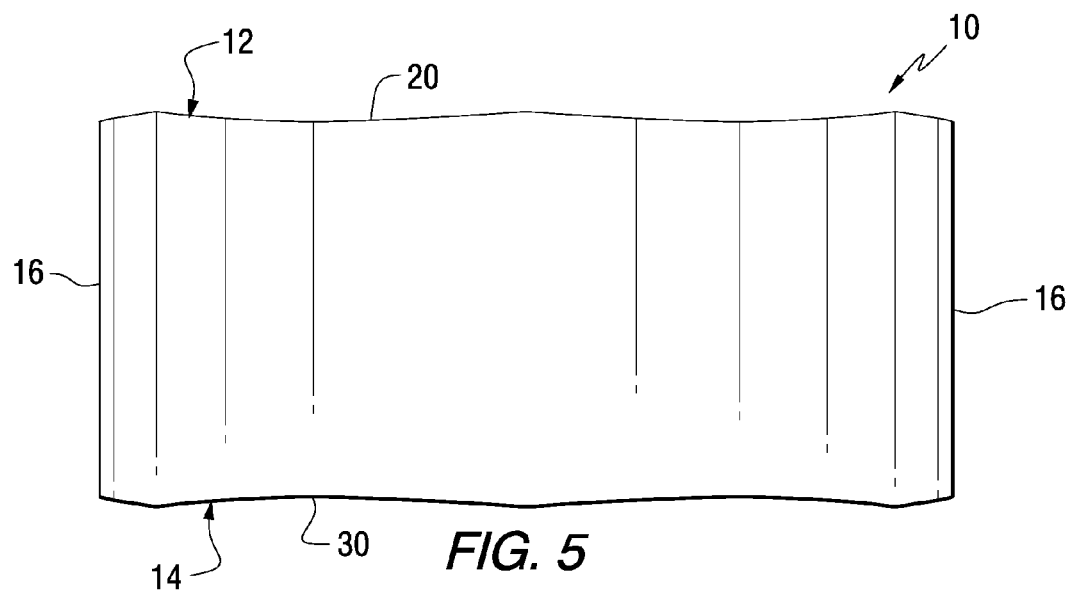
FIG. 5 is a side view of the cutting insert illustrated in FIG. 1, in accordance with an aspect of the invention.

FIG. 4 illustrates the second or bottom portion 14 of the cutting insert 10. It will be appreciated that the second or bottom portion 14 is essentially identical to the first or top portion 12 that is illustrated, for example, in FIGS. 1 and 2. More specifically, as illustrated in FIG. 4 the second portion 14 of the cutting insert 10 includes a second outer surface 28 that terminates in a generally outwardly direction in a second cutting edge 30 and terminates in a generally inwardly direction in a second inner edge 32. In one aspect, the second outer surface 28 slopes from the second cutting edge 30 toward the second inner edge 32. The second portion 14 of the cutting insert 10 also includes a second inner surface 34 that extends in a generally inwardly direction from the second inner edge 32 toward the opening 23 that extends axially through the cutting insert 10. In one aspect, the second outer surface 28 may be contained in a plane and the second inner surface 34 may be contained in another plane that is non-parallel to the plane containing the second outer surface 28.

Still referring to FIG. 4, the bottom portion 14 of the cutting insert 10 further includes a plurality of second projections 36. In one aspect, the plurality of second projections 36 are formed adjacent to the second inner edge 32. In another aspect, the plurality of second projections 36 are formed on the second inner surface 34 to create a raised profile projection. In another aspect, the plurality of second projections 36 are evenly circumferentially spaced about the second inner surface 34. The second cutting edge 30 is circumferentially disposed about the plurality of second projections 36 and in one aspect the plurality of second projections 36 each include a top surface 37 contained in a plane wherein at least a portion of the second cutting edge 30 is contained in a different plane.

Figure 8:
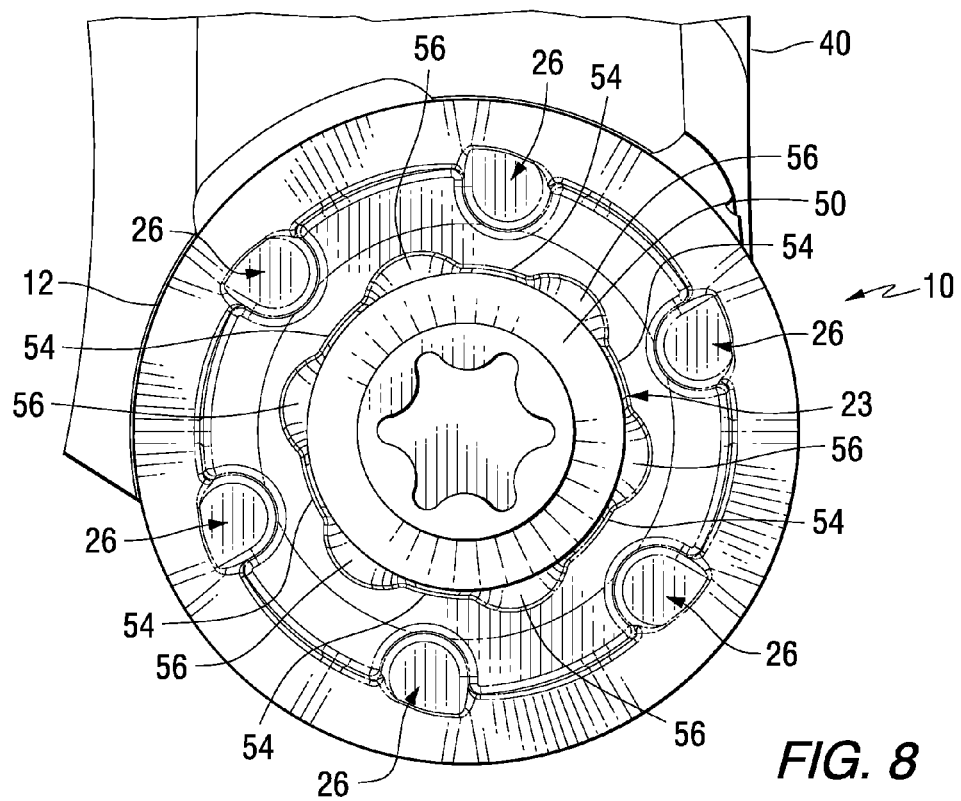
FIG. 8 is an enlarged, partial view of a portion of the cutting tool assembly illustrated in FIG. 6, in accordance with an aspect of the invention.
Figure 6:
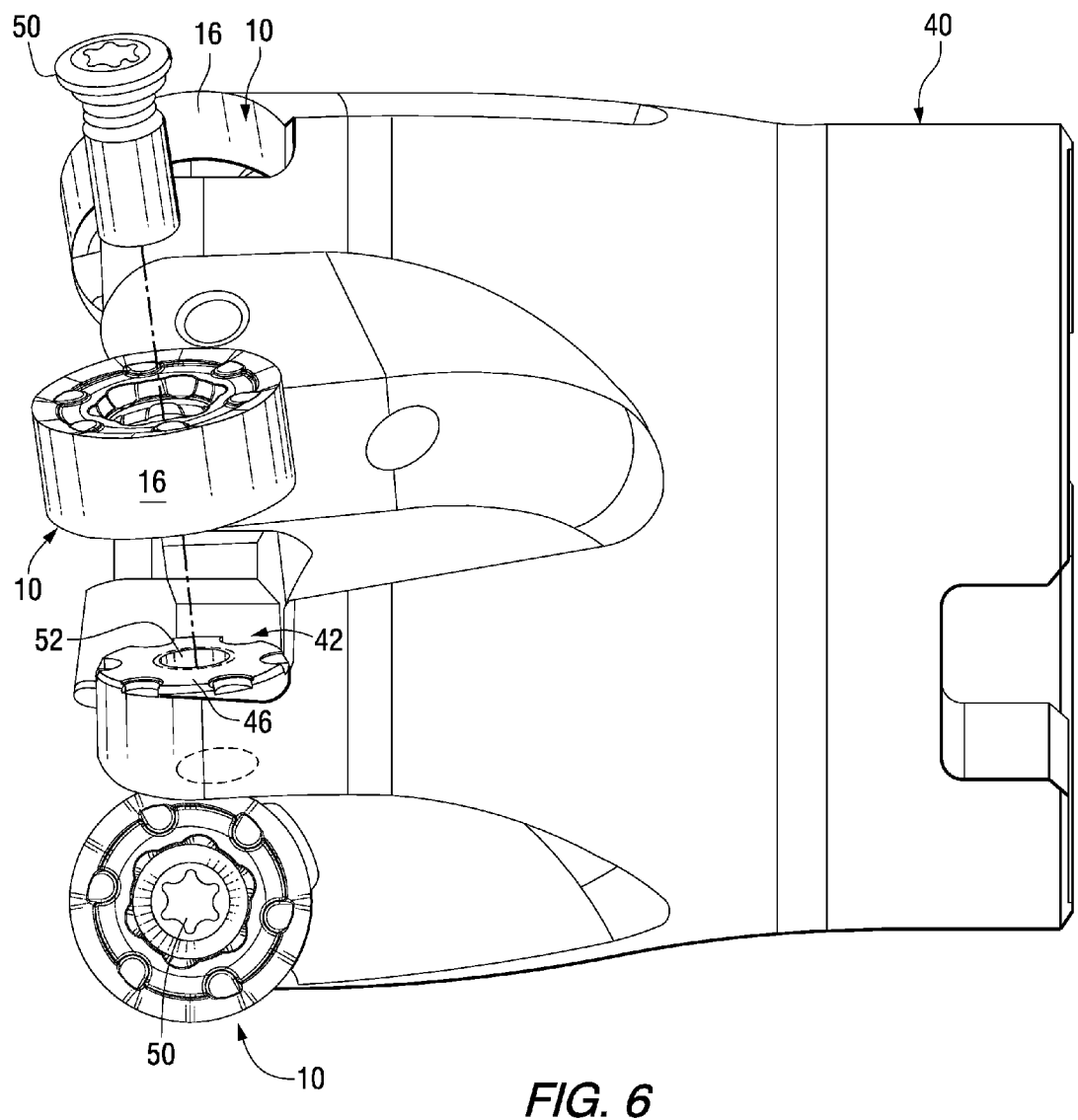
FIG. 6 is an elevational view of a cutting tool assembly, in accordance with an aspect of the invention.
Figure 7:
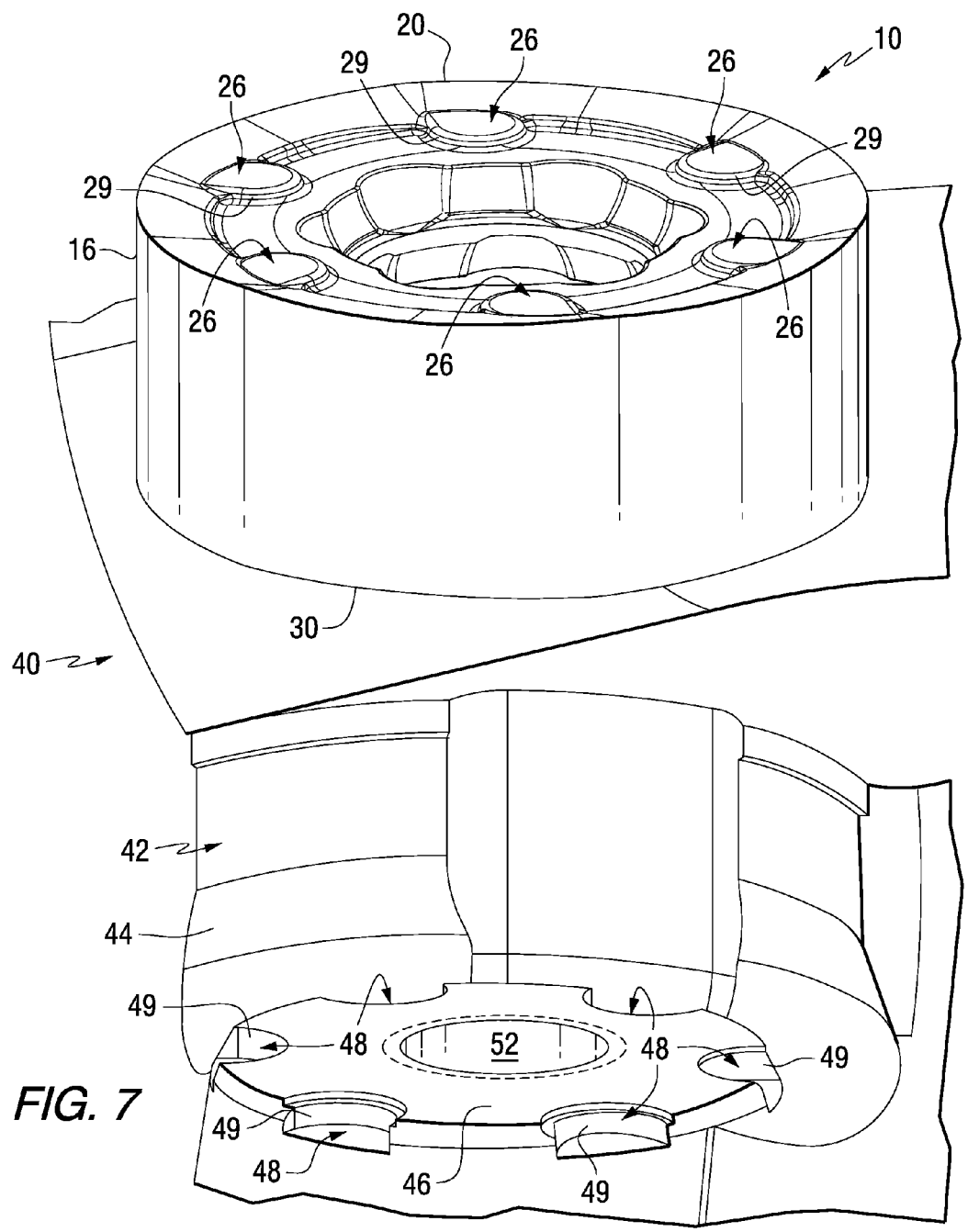
FIG. 7 is a partial, exploded view of a portion of the cutting tool assembly illustrated in FIG. 6, in accordance with an aspect of the invention.

Referring to FIGS. 6-8, there is illustrated a cutting tool assembly wherein a plurality of the cutting inserts 10 are mounted to a tool body 40. More specifically, the cutting inserts 10 are removably mounted in an insert receiving pocket 42 of the tool body 40. The insert receiving pocket 42 includes a sidewall 44 and a support surface 46. The generally circular side surface 16 of the cutting inserts 10 are received in the insert receiving pocket 42 adjacent to sidewall 44. In addition, one of the first portion 12 or second portion 14 of the cutting inserts 10 are received and supported on the support surface 46 of the insert receiving pocket 42. In one aspect of the invention, one of the first inner surface 24 or the second inner surface 34 of the cutting inserts 10 are received and supported on the support surface 46 of the insert receiving pocket 42. More specifically, the support surface 46 includes a plurality of dimples 48 formed therein for cooperating with and receiving one of the plurality of first projections 26 or the plurality of second projections 36. In one aspect, the dimples 48 are evenly circumferentially spaced about the surface 46. It will be appreciated that if the plurality of second projections 36 are received in the plurality of dimples 48 then the first cutting edge 20 is positioned to perform a cutting operation. Similarly, if the plurality of first projections 26 are received in the plurality of dimples 48, then the second cutting edge 30 is positioned for performing a cutting operation. Accordingly, it will be appreciated that the cutting insert 10 is reversible and provides for the first cutting edge 20 and the second cutting edge 30 so as to provide for a longer life of operation for the cutting insert 10.

Still referring to FIGS. 6-8, a fastening screw 50 is provided for extending through the opening 23 of the cutting insert 10 and being received in a fastening hole 52 of the insert receiving pocket 42. The fastening screw 50 provides for removably securing the insert 10 to the tool body 40 and, more particularly, for removably securing the cutting insert 10 to the insert receiving pocket 42 of the tool body 40.

As described herein, one of the plurality of first projections 26 or the plurality of second projections 36 is received in the dimples 48 of the insert receiving pocket 42. Once the fastening screw 50 is positioned to secure the cutting insert 10 in the insert receiving pocket 42, the cooperation between one of the plurality of first projections 26 or the plurality of second projections 36 and the dimples 48 prevents rotation of the insert 10 due to the projections 26 or 36 being received in the corresponding plurality of dimples 48. Advantageously, the cutting insert 10 is therefore unable to rotate within the insert receiving pocket 42 during a cutting operation and thus providing the anti-rotation aspect of the invention.

In addition, the plurality of first projections 26 each include a sidewall 29 for cooperating with a sidewall 49 of each of the plurality of dimples 48. Similarly, the plurality of second projections 36 each include a sidewall 39 for cooperating with the sidewall 49 of each of the plurality of dimples 48. Advantageously, this arrangement further prevents the cutting insert 10 from being unable to rotate within the insert receiving pocket 42.

In accordance with another aspect of the invention, the cutting insert 10 is indexable for both the first cutting edge 20 and the second cutting edge 30. For example, once a portion of either the first cutting edge 20 or the second cutting edge 30 has been used, then the fastening screw 50 can be loosened and the cutting insert 10 lifted such that either the first projections 26 or the second projections 36 are removed from the plurality of dimples 48 and then the cutting insert 10 can be turned or rotated and the projections 26 or the projections 36 reinserted into the plurality of dimples 48 followed by the fastening screw 50 being reinserted as well. By providing for the plurality of first projections 26 and the plurality of second projections 36, a user can easily identify how much the cutting insert 10 is rotated during the indexing of the cutting insert 10 as described. It will be appreciated that the first projections 26 are generally opposed to the second projections 36 in order to allow for a user to accurately position the projections 26 or 36 within the dimples 48.

Referring to FIGS. 1, 2 and 8, for example, the opening 23 that extends axially through the cutting insert 10 has a generally non-cylindrical shape or configuration, in accordance with an aspect of the invention. More particularly, the opening 23 adjacent the first portion 12 of the cutting insert includes a plurality of first contact surfaces 54 spaced circumferentially about the opening 23. In addition, the opening 23 includes a corresponding plurality of first recesses 56 positioned between the plurality of first contact surfaces 54 to space apart the first contact surfaces 54. It will be appreciated that in accordance with an aspect of the invention, the opening 23 adjacent the second portion 14 has essentially the identical structure of a plurality of contact surfaces spaced circumferentially about the opening 23 and spaced apart by a corresponding plurality of recesses.

As illustrated in FIG. 8, when the fastening screw 50 is positioned through the opening 23 of the cutting insert 10, the head of the fastening screw contacts the plurality of first contact surfaces 54, but does not contact the corresponding plurality of first recesses 56.

Whereas particular embodiments of this invention have been described above for purposes of illustration, it will be evident to those skilled in the art that numerous variations of the details of the present invention may be made without departing from the invention as defined in the appended claims.

What is claimed is:

1. A round cutting insert, comprising:
    a first outer surface that terminates generally outwardly in a first cutting edge and terminates generally inwardly in a first inner edge;
    a first inner surface extending generally inwardly from the first inner edge;
    a plurality of first projections formed adjacent to the first inner edge, wherein the plurality of first projections extend at least partially onto the first outer surface;
    wherein the plurality of first projections each include a top surface contained in a plane that is recessed with respect to a different plane that contains the first cutting edge;
    a second outer surface that terminates generally outwardly in a second cutting edge and terminates generally inwardly in a second inner edge;
    a second inner surface extending generally inwardly from the second inner edge;
    a plurality of second projections formed adjacent to the second inner edge, wherein the plurality of second projections extend at least partially onto the second outer surface;
    wherein the plurality of second projections each include a top surface contained in a plane that is recessed with respect to a different plane that contains the second cutting edge; and
    a generally circular side surface that extends between the first outer surface and the second outer surface.

2. The round cutting insert of claim 1, wherein the plurality of first projections extend onto the first inner surface and wherein the plurality of second projections extend onto the second inner surface.

3. The round cutting insert of claim 2, wherein the plurality of first projections are evenly circumferentially spaced about the first inner surface and wherein the plurality of second projections are evenly circumferentially spaced about the second inner surface.

4. The round cutting insert of claim 1, wherein the first cutting edge is circumferentially disposed about the plurality of first projections and wherein the second cutting edge is circumferentially disposed about the plurality of second projections.

5. The round cutting insert of claim 1, wherein the plurality of first projections are generally opposed to the plurality of second projections.

6. The round cutting insert of claim 1, wherein the first outer surface slopes from the first cutting edge toward the first inner edge and wherein the second outer surface slopes from the second cutting edge toward the second inner edge.

7. The round cutting insert of claim 1:
    wherein the first outer surface is contained in a plane and the first inner surface is contained in another plane that is non-parallel to the plane containing the first outer surface; and
    wherein the second outer surface is contained in a plane and the second inner surface is contained in another plane that is non-parallel to the plane containing the second outer surface.

8. A round cutting insert, comprising:
    a plurality of first projections formed on a first surface;
    a first cutting edge disposed circumferentially about the plurality of first projections and a first outer surface that extends generally inwardly from the first cutting edge, wherein the plurality of first projections extend at least partiall onto the first outer surface;
    wherein the plurality of first projections each include a top surface contained in a plane that is recessed with respect to a different plane that contains the first cutting edge;
    a plurality of second projections formed on a second surface that is generally opposed to the first surface;
    a second cutting edge disposed circumferentially about the plurality of second projections and a second outer surface that extends generally inwardly from the second cutting edge, wherein the plurality of the second projections extend at least partially onto the second outer surface; and
    wherein the plurality of second projections each include a top surface contained in a plane that is recessed with respect to a different plane that contains the second cutting edge.

9. The round cutting insert of claim 8, further comprising a generally circular side surface that extends between the first cutting edge and the second cutting edge.

10. An anti-rotation mounting arrangement between a round cutting insert and an insert receiving pocket in a tool body, the round insert including a first portion that terminates in a first cutting edge, and includes a first outer surface that extends generally inwardly from the first cutting edge, a second portion that terminates in a second cutting edge and includes a second outer surface that extends generally inwardly from the second cutting edge, and a circular side surface between the first portion and the second portion, comprising:
    a plurality of first projections extending from the first portion, wherein the plurality of first projections extend at least partially onto the first outer surface;
    wherein the plurality of first projections each include a top surface contained in a lane that is recessed with respect to a different plane that contains the first cutting edge;
    a plurality of second projections extending from the second portion, wherein the plurality of second projections extend at least partially onto the second outer surface;
    wherein the plurality of second projections each include a top surface contained in a plane that is recessed with respect to a different plane that contains the second cutting edge; and a plurality of dimples formed in the insert receiving pocket for cooperating with and receiving one of the plurality of first projections or the plurality of second projections to prevent rotation of the round cutting insert while mounted in the insert receiving pocket.

11. The anti-rotation mounting mechanism of claim 10, wherein one of the plurality of first projections or the plurality of second projections is removably received in the corresponding plurality of dimples.

12. The anti-rotation mounting mechanism of claim 10, wherein the round cutting insert is reversible.

13. The anti-rotation mounting mechanism of claim 10, wherein the round cutting insert is indexable.

14. The anti-rotation mounting mechanism of claim 10, wherein the plurality of dimples are evenly circumferentially spaced about a pocket surface of the insert receiving pocket.

15. A cutting tool assembly, comprising:
a tool body having an insert receiving pocket;
an insert that is received in the insert receiving pocket, the insert having a first portion having a first cutting edge generally disposed about an outer periphery of the first portion and a first outer surface that extends generally inwardly from the first cutting edge, and a second portion having a second cutting edge generally disposed about an outer periphery of the second portion and a second outer surface that extends generally inwardly from the second cutting edge, the insert defining a non-cylindrical opening extending axially through said insert from the first portion to the second portion;
the insert further having a plurality of first projections extending from the first portion wherein the plurality of first projections each include a top surface contained in a plane that is recessed with respect to a different plane that contains the first cutting edge, and wherein the plurality of first projections extend at least partially onto the first outer surface;
the insert further having a plurality of second projections extending from the second portion wherein the plurality of second projections each include a top surface contained in a plane that is recessed with respect to a different plane that contains the second cutting edge, and wherein the plurality of second projections extend at least partially onto the second outer surface; and
a fastening screw that extends through the non-cylindrical opening to removably secure the insert to the insert receiving pocket of the tool body.

16. The cutting tool assembly of claim 15, wherein for use of the first cutting edge a first end of the non-cylindrical opening adjacent the first portion includes a plurality of first contact surfaces spaced circumferentially thereabout which are spaced apart by a corresponding plurality of first recesses such that a head of the fastening screw contacts the plurality of first contact surfaces to secure the insert to the insert receiving pocket of the tool body but the head does not contact the plurality of first recesses.

17. The cutting tool assembly of claim 16, wherein for use of the second cutting edge a second end of the non-cylindrical opening adjacent the second portion includes a plurality of second contact surfaces spaced circumferentially thereabout which are spaced apart by a corresponding plurality of second recesses such that the head of the fastening screw contacts the plurality of second contact surfaces to secure the insert to the insert receiving pocket of the tool body but the head does not contact the plurality of second recesses.

18. The cutting tool assembly of claim 15, further comprising:
a plurality of dimples formed in the insert receiving pocket for cooperating with and receiving one of the plurality of first projections or the plurality of second projections to prevent rotation of the insert while mounted in the insert receiving pocket.

19. The cutting tool assembly of claim 18, wherein one of the plurality of first projections or the plurality of second projections is removably received in the corresponding plurality of dimples.

* * * * *